(12) United States Patent
Burger et al.

(10) Patent No.: US 6,225,717 B1
(45) Date of Patent: May 1, 2001

(54) ELECTROMOTOR

(75) Inventors: Helmut Burger, Moorenweis; Josef Fünfer, Königsbrunn, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/524,472

(22) Filed: Mar. 13, 2000

(30) Foreign Application Priority Data

Mar. 15, 1999 (DE) .............................. 199 11 355

(51) Int. Cl.[7] .................................... H02K 11/00
(52) U.S. Cl. ..................... 310/71; 310/239; 310/249
(58) Field of Search .............. 310/239, 71, 249, 310/244, 238

(56) References Cited

U.S. PATENT DOCUMENTS 3,654,504 * 4/1972 Susdorf et al. .................. 310/239
4,593,200 * 6/1986 Cousins et al. .................. 310/239
6,133,665 * 10/2000 Prell et al. ....................... 310/239

* cited by examiner

*Primary Examiner*—Nestor Ramirez
*Assistant Examiner*—Thanh Lam
(74) *Attorney, Agent, or Firm*—Brown & Wood, LLP

(57) ABSTRACT

An electromotor including a stator (1), a rotor (2), a commutator (3) fixedly connected with the rotor (2), two carbon brushes (5) cooperating with the commutator (3), two brush holders (4) spaced from each other and aligned coaxially relative to each other, and a connection member (6) for connecting the two brush holders (4) and having two connection sections (7) formed of a non-conductive material, and an elastic section (9) extending between the connection sections (7), with each connection section (7) having an attachment point (13) for releasably connecting the connection section (7) with the stator, and with each brush holder (4) having an end region projecting beyond the carbon brush and with which the brush holder is arranged on the associated connection section (7).

3 Claims, 1 Drawing Sheet

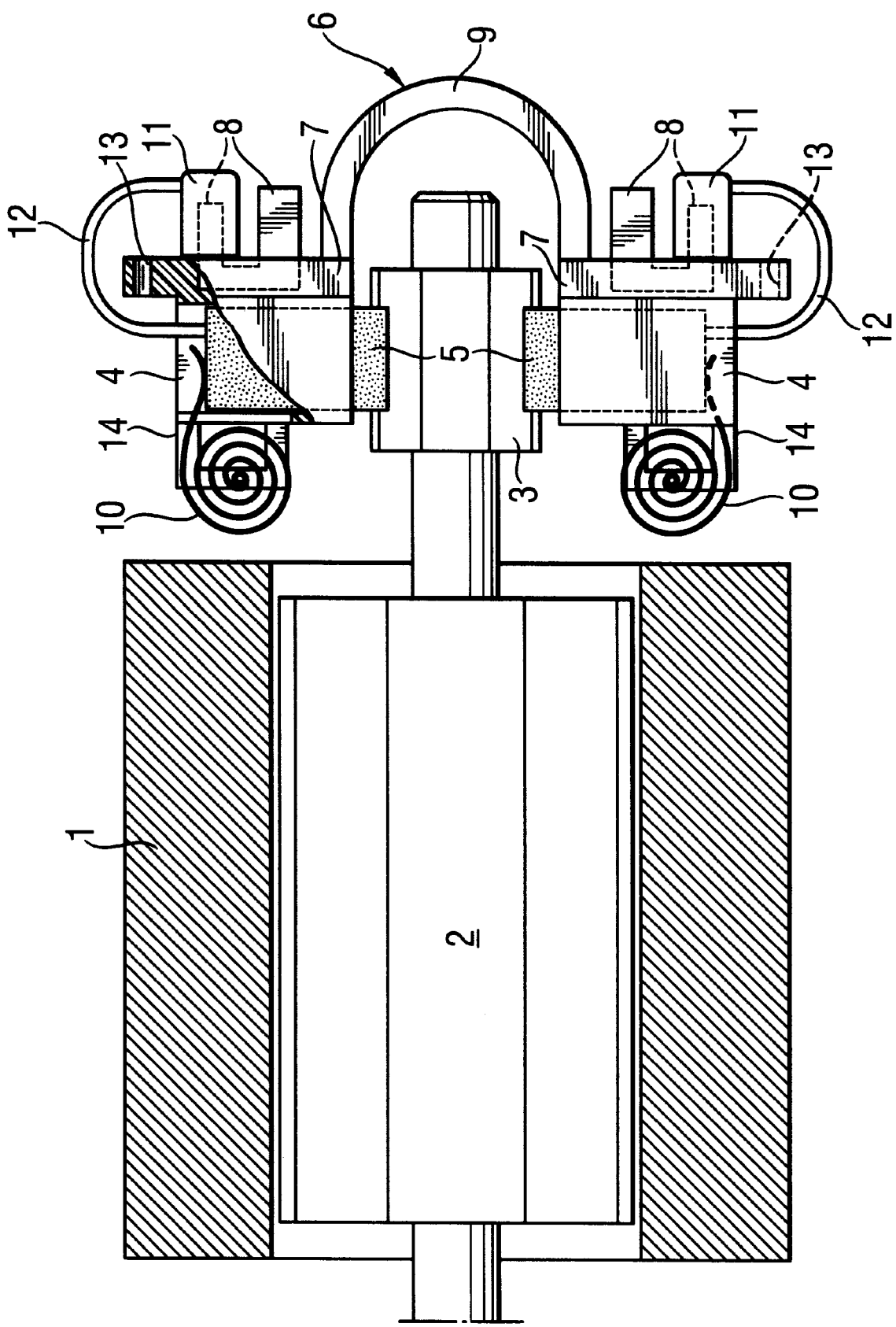

ELECTROMOTOR

BACKGROUND OF THE INVENTION

1. Field of the Invention

The present invention relates to an electromotor including a stator, a rotor, a commutator fixedly connected with the rotor for joint rotation therewith, two carbon brushes cooperating with the commutator, two brush holders spaced from each other and aligned coaxially relative to each other, and a connection member for connecting the two brush holders and having two connection sections and releasably connectable with the stator, with each brush holder having an end region projecting beyond the carbon brush and with which the brush holder is arranged on the connection section of a connection member that connects the two brush holders.

2. Description of the Prior Act

A drill, which is produced by the assignee of the present invention, includes a rotor, a stator, a commutator fixedly connected with the rotor for joint rotation therewith, and two brush holders in which two carbon brushes, which cooperate with the commutator, are respectively received. Both brush holders are arranged on connection sections of a ring-shaped connection member, with the distance between the brush holders only slightly exceeding the outer diameter of the commutator. Because the carbon brushes project beyond the respective and regions of respective brush holders when the brush holders or the connection member are not mounted, the carbon brushes need be pressed, during mounting of the brush holders or the connection member, with any suitable tool, e.g., a screw driver, into the brush holders against a biasing force of respective springs cooperating with the carbon brushes in order to be able to push the brush holders over the commutator.

Accordingly, an object of the present invention is to provide an electromotor in which both brush holders, together with the carbon brushes can be mounted quickly, simply, and reliably, without the use of any auxiliary tool.

SUMMARY OF THE INVENTION

This and other objects of the present invention, which will become apparent hereinafter, are achieved by providing a connection member for connecting the two brush holders and including an elastic section extending between the connection sections, with each connection section having an attachment point for connecting the connection section with the stator, and with each brush holder having an end region projecting beyond the carbon brush and with which the brush holder is arranged on a respective connection section of the connection member.

The elastic intermediate section of the connection member insures that both brush holders can be moved apart from each other to such an extent that the two brush holders can be easily pushed over the commutator despite the carbon brushes projecting from the respective holders. The attachment points, which are provided on the connection sections and which are formed as through-openings extending parallel to the rotor longitudinal axis, insure that the entire connection member is reliably secured to the stator with the attachment elements screwed into the stator.

Advantageously, the elastic connection section is formed as a U-shaped arch which projects, at its opposite ends, from respective sides of the connection sections remote from the brush holders. By forming the intermediate section as an arch, in particular, having a thin wall, the brush holders can be easily moved apart by a comparatively large distance. This is particularly advantageous when, for reasons of accessibility, the brush holders need be mounted parallel to the rotor longitudinal axis and, therefore, must be pushed over points at the end of the rotor the outer diameter of which is larger than the outer diameter of the commutator.

In order to insure an easy and rapid feeding of a current from a current source to the carbon brushes, which are arranged in the brush holders, e.g., via flat plugs provided on the brush holders, advantageously, each brush holder is provided with two connection lugs formed integrally with the brush holders. The connection lugs project from the sides of the connection sections opposite the brush holders.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

Single FIGURE of the drawings shows a side, partially cross-sectional, schematic view of an electromotor according to the present invention.

DETAILED DESCRIPTION OF THE PREFERRED EMBODIMENT

An electromotor according to the present invention, which is shown in the drawing, includes a stator 1, a rotor 2, a commutator 3, which is fixedly connected with the rotor 2, two carbon brushes 5, which cooperate with the commutator 3, and two brush holders 4. The two brush holders 4 are arranged coaxically with each other and are spaced from each other. The two brush holders 4 have end regions, which project beyond the respective carbon brushes 5 and are arranged on two plate-shaped connection sections 7 of a connection member 6 connecting the two brush holders 4. Both connection sections 7 extend in a direction perpendicular to a longitudinal axis of the rotor 2.

Each of the two connections sections 7 serves, in addition to supporting a brush holder 4, for securing the connection member 6 on the stator 1. To provide for securing the connection sections 7 to the stator 1, each connection section 7 has a through-opening extending parallel to the longitudinal axis of the rotor 2 and defining at least one attachment point 13. The attachment point 13 is located sidewise of the respective brush holder 4. The connection member 6 is secured to the stator 1 with respective attachment elements (not shown) extending into the stator 1. Between the two connection sections 6, an elastic, arch-shaped connection section 9 extends. The elastic connection section 9 projects, at its opposite ends, from respective sides of the connection sections 7 remote from the respective brush holders 4. The elastic connection section 9 provides for movement of the connection sections 7, together with the brush holders 4 and the carbon brushes 5, apart from each other, when the connection sections 7 are not secured to the stator 1 with the attachment elements.

Both connection sections 7 are pierced with terminal lugs 8 which project beyond the sides of the connection sections 7 remote from the brush holders 4. Both connection lugs 8 form part of a respective brush holder 4. One of the two connection lugs 8 of each connection section 7 carries a flat plug 11 to which an electrical connection cable 12 is secured. The opposite end of the connection cable is connected with the carbon brush 5 which is arranged in the brush holder 4. The other connection lug 8 is connectable with a pole of a direct current source (not shown).

A support member 14 projects from a side of each brush holder 4 remote from the connection section 7. The support member 14 serves for supporting a spring 10 which cooperates with a carbon brush 5. The spring 10 is formed as a sling spring. The springs 10 press respective carbon brushes 5 against the commutator 3.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An electromotor, comprising a stator (1); a rotor (2); a commutator (3) fixedly connected with the rotor (2) for joint rotation therewith; two carbon brushes (5) cooperating with the commutator (3); two brush holders (2) spaced from each other and aligned coaxially relative to each other, each having an end region which is projected beyond a carbon brush (5), end regions of the brush holders (4) facing each other, and the brush holders (4) being arranged on respective connection sections (7) of a connection member (6) formed of a non-conductive material and releasably connectable with the stator, the connection member (6) having an elastic section (9) extending between the connection sections (7), each connection section (7) having an attachment point (13) for connecting the connection section (7) with the stator.

2. An electromotor according to claim 1, wherein the elastic section (9) is formed as a U-shaped arch which projects, at opposite ends thereof, from sides of the connection sections (7) opposite the brush holders.

3. An electromotor according to claim 2, further comprising two electrical connection lugs (8) formed integrally with a respective brush holder (4) and projecting from a side of a respective connection section (7) opposite the respective brush holder (4).

* * * * *